US010393149B2

(12) United States Patent
Mondal et al.

(10) Patent No.: US 10,393,149 B2
(45) Date of Patent: *Aug. 27, 2019

(54) METHOD AND APPARATUS FOR ACTIVE CLEARANCE CONTROL

(71) Applicant: General Electric Company, Schenectady, NY (US)

(72) Inventors: Bhaskar Nanda Mondal, Bangalore (IN); Kenneth Edward Seitzer, Mason, OH (US); Monty Lee Shelton, Loveland, OH (US); Thomas Ory Moniz, Loveland, OH (US); Atanu Saha, Bangalore (IN)

(73) Assignee: General Electric Company, Schenectady, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 15/447,565

(22) Filed: Mar. 2, 2017

(65) Prior Publication Data
US 2017/0268535 A1    Sep. 21, 2017

(30) Foreign Application Priority Data

Nov. 3, 2016  (IN) .............................. 201641008506

(51) Int. Cl.
*F04D 29/58* (2006.01)
*F04D 29/64* (2006.01)
(Continued)

(52) U.S. Cl.
CPC ............ *F04D 29/642* (2013.01); *F01D 11/24* (2013.01); *F02K 3/06* (2013.01); *F04D 19/02* (2013.01);
(Continued)

(58) Field of Classification Search
CPC ............... F04D 29/642; F04D 29/5846; F04D 29/5853; F01D 11/24; F01D 19/02;
(Continued)

(56) References Cited

U.S. PATENT DOCUMENTS 4,329,114 A   5/1982   Johnston et al.
4,338,061 A   7/1982   Beitler et al.
(Continued)

FOREIGN PATENT DOCUMENTS

JP    S57-035105 A    2/1982
JP    2015-132269 A   7/2015
(Continued)

OTHER PUBLICATIONS

Extended European Search Report and Opinion issued in connection with corresponding EP Application No. 17160474.7 dated Aug. 3, 2017.
(Continued)

*Primary Examiner* — Hai H Huynh
(74) *Attorney, Agent, or Firm* — Dority & Manning, P.A.

(57) ABSTRACT

The turbomachine includes a compressor, an inner annular casing, and an outer annular casing. The inner annular casing and the outer annular casing define at least one cavity therebetween. The clearance control system includes a manifold system including at least one conduit disposed within the cavities and configured to channel a flow of cooling fluid between the cavities. The clearance control system also includes an impingement system including a header and at least one plenum configured to channel the flow of cooling fluid to the inner annular casing. The conduits configured to channel the flow of cooling fluid to the impingement system. The clearance control system further includes a channel system including at least one channels configured to channel the flow of cooling fluid to
(Continued)

the turbomachine. The channels are configured to control the flow of cooling fluid to the manifold system.

20 Claims, 3 Drawing Sheets

(51) Int. Cl.
    *F02K 3/06*     (2006.01)
    *F04D 19/02*     (2006.01)
    *F01D 11/24*     (2006.01)

(52) U.S. Cl.
    CPC ..... *F04D 29/5846* (2013.01); *F04D 29/5853* (2013.01); *F05D 2220/32* (2013.01); *F05D 2260/201* (2013.01); *Y02T 50/671* (2013.01)

(58) Field of Classification Search
    CPC .... F02K 3/06; Y02T 50/671; F05D 2260/201; F05D 2220/32
    USPC .......................................... 415/173.1, 74, 81
    See application file for complete search history.

(56) References Cited

U.S. PATENT DOCUMENTS

| | | | |
|---|---|---|---|
| 4,683,716 A | 8/1987 | Wright et al. | |
| 5,100,291 A | 3/1992 | Glover | |
| 5,160,241 A | 11/1992 | Glynn | |
| 5,273,396 A | 12/1993 | Albrecht et al. | |
| 5,281,085 A | 1/1994 | Lenahan et al. | |
| 5,399,066 A | 3/1995 | Ritchie et al. | |
| 5,779,436 A | 7/1998 | Glezer et al. | |
| 6,487,491 B1 | 11/2002 | Karpman et al. | |
| 7,434,402 B2 | 10/2008 | Paprotna et al. | |
| 8,147,192 B2 | 4/2012 | Jones et al. | |
| 8,152,457 B2 | 4/2012 | Flanagan et al. | |
| 8,175,521 B2 | 5/2012 | Tillery et al. | |
| 9,003,807 B2 | 4/2015 | Chehab et al. | |
| 10,087,772 B2 * | 10/2018 | Sun | F04D 29/584 |
| 2008/0112798 A1 | 5/2008 | Seltzer et al. | |
| 2012/0167588 A1 | 7/2012 | Dierksmeier et al. | |
| 2014/0241854 A1 | 8/2014 | Gekht et al. | |
| 2015/0159499 A1 | 6/2015 | Bacic et al. | |

FOREIGN PATENT DOCUMENTS

| | | |
|---|---|---|
| RU | 2 567 892 C1 | 11/2015 |
| WO | 2007/033649 A1 | 3/2007 |

OTHER PUBLICATIONS

Machine Translation and Notification of Reasons for Refusal issued in connection with corresponding JP Application No. 2017-042309 dated Mar. 6, 2018.

* cited by examiner

METHOD AND APPARATUS FOR ACTIVE CLEARANCE CONTROL

BACKGROUND

The field of the disclosure relates generally to gas turbine engines and, more particularly, to a method and apparatus for active clearance control in gas turbine engines.

At least some known aircraft engines generate heat during operation in various internal components, such as, but, not limited to, a high pressure compressor, which includes a rotor disk, compressor blades coupled to the rotor disk, and a casing housing the high-pressure compressor. Differential thermal expansion of the disk, compressor blades, and compressor casing change the clearance between the tips of the compressor blades and the inner surface of the compressor casing. Engine inefficiencies occur when the clearance between the compressor blade tips and the inner surface of the compressor casing is large, thereby facilitating decreased compressor pressure rise capability and decreased stability. Active clearance control maintains the clearance between the compressor blade tips and the inner compressor casing. At least some of the known methods for controlling the clearance between the compressor blade tips and the inner compressor casing are active thermal control and active mechanical control. For example, some known active thermal control methods use compressor bleed air and fan exhaust air to cool the inner compressor casing. Compressor bleed air and fan exhaust air are directed to the outer radial surface of the inner compressor case. The compressor bleed air and fan exhaust air cool the inner compressor casing. The active thermal control method has a slow thermal response.

In addition, some known active mechanical control methods use linkages and actuation to control the clearance between the compressor blade tips and the inner compressor casing. Segmented shrouds attached to a unison ring and actuators individually control the positioning of each shroud. The active mechanical control method has a quick response rate, but the additional equipment required for the active mechanical control method adds weight to the aircraft.

BRIEF DESCRIPTION

In one aspect, a clearance control system for a turbomachine is provided. The turbomachine includes a compressor defining an axis of rotation and an inner annular casing extending circumferentially over at least a portion of the compressor. The inner annular casing includes a radially outer surface. The turbomachine further includes an outer annular casing extending over at least a portion of the inner annular casing. The inner annular casing and the outer annular casing define a plurality of cavities therebetween. The clearance control system includes a manifold system including a plurality of conduits disposed within the plurality of cavities. The plurality of conduits extends axially along the inner annular casing. The plurality of conduits is configured to channel a flow of cooling fluid between the plurality of cavities. The clearance control system also includes an impingement system including a header and a plurality of plenums configured to channel the flow of cooling fluid to the radially outer surface of the inner annular casing and disposed within the plurality of cavities. The impingement system extends circumferentially about the inner annular casing. The plurality of conduits is configured to channel the flow of cooling fluid to the impingement system. The clearance control system further includes a channel system including a plurality of channels disposed on the radially outer surface of the outer annular casing and is configured to channel the flow of cooling fluid to the turbomachine. Wherein, the plurality of channels is configured to control the flow of cooling fluid to the manifold system.

In another aspect, a method of controlling a clearance between a tip of a plurality of compressor blades and an inner annular casing is provided. The method includes defining a first cavity, a second cavity, and a third cavity between the inner annular casing and an outer annular casing. The method also includes channeling a plurality of flows of cooling fluid from the first cavity to a manifold system including a plurality of conduits disposed within the second and third cavities. The method further includes channeling the plurality of flows of cooling fluid from the manifold system to an impingement system disposed within the third cavity and positioned on a radially outer surface of the inner annular casing.

In yet another aspect, a turbomachine is provided. The turbomachine includes a compressor defining an axis of rotation and an inner annular casing extending circumferentially over at least a portion of the compressor. The inner annular casing includes a radially outer surface. The turbomachine further includes an outer annular casing extending over at least a portion of the inner annular casing. The inner annular casing and the outer annular casing define a plurality of cavities therebetween. The clearance control system includes a manifold system including a plurality of conduits disposed within the plurality of cavities. The plurality of conduits extends axially along the inner annular casing. The plurality of conduits is configured to channel a flow of cooling fluid between the plurality of cavities. The clearance control system also includes an impingement system including a header and a plurality of plenums configured to channel the flow of cooling fluid to the radially outer surface of the inner annular casing and disposed within the plurality of cavities. The impingement system extends circumferentially about the inner annular casing. The plurality of conduits is configured to channel the flow of cooling fluid to the impingement system. The clearance control system further includes a channel system including a plurality of channels disposed on the radially outer surface of the outer annular casing and configured to channel the flow of cooling fluid to the turbomachine. Wherein, the plurality of channels is configured to control the flow of cooling fluid to the manifold system.

DRAWINGS

These and other features, aspects, and advantages of the present disclosure will become better understood when the following detailed description is read with reference to the accompanying drawings in which like characters represent like parts throughout the drawings, wherein.

Figure 1:
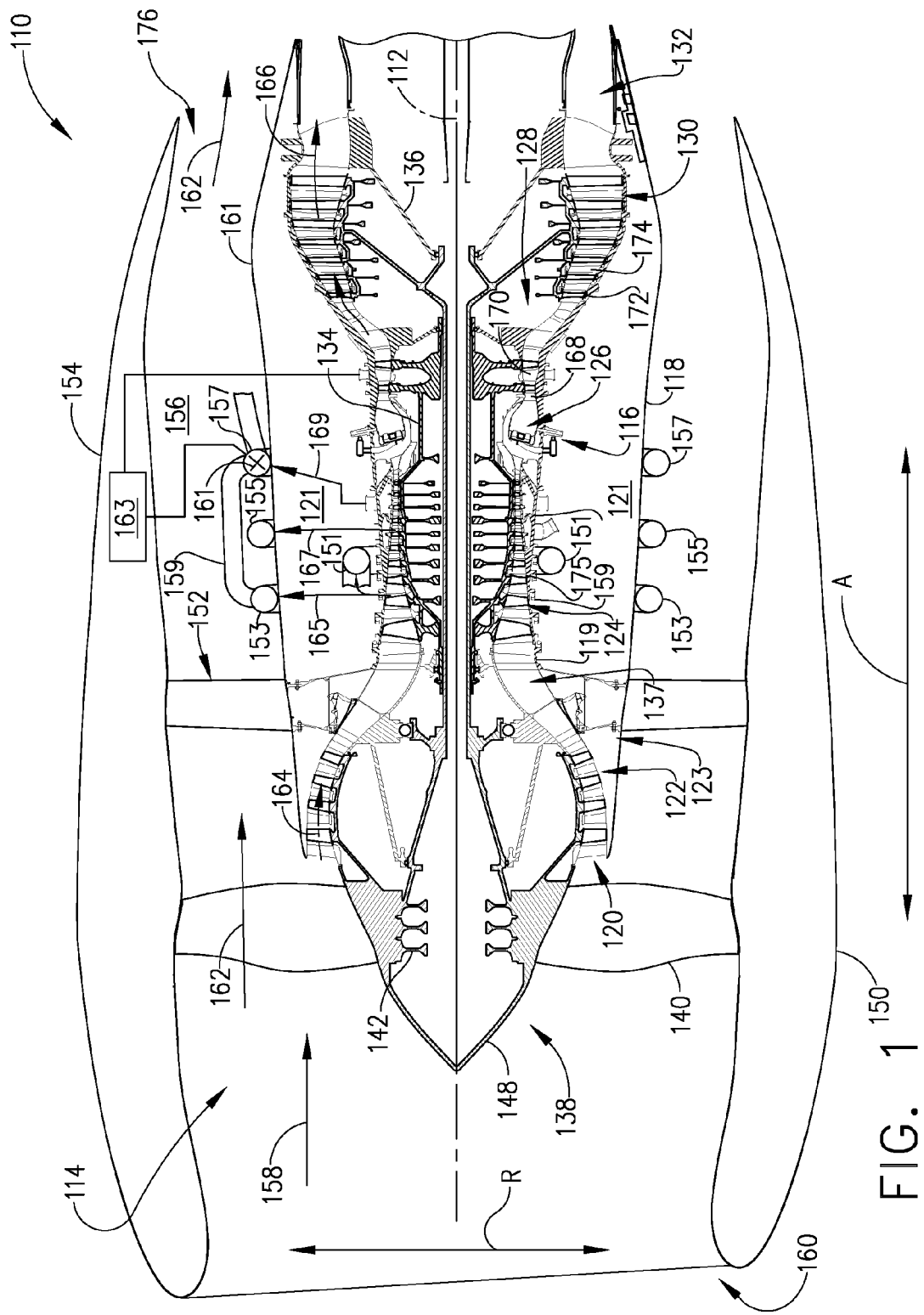
FIG. 1 is a schematic view of a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer", and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Embodiments of the active clearance control system described herein control the clearance between the inner annular casing of, for example, a high pressure compressor in a turbomachine, e.g. an aircraft engine, and high pressure compressor blade tips. The active clearance control system includes an air inlet, a manifold system, a controller, and an impingement system. The air inlet directs fourth stage compressor bleed air from the bypass airflow passage to the manifold system. The manifold system directs air to the impingement system through a distribution manifold and a plurality of supply tubes. An air valve and a controller control the volume of air directed to the impingement system. The supply tubes direct air to a plurality of plenums in the impingement system. The plenums cool the inner annular casing of the high pressure compressor by directing air to the radially outer surface of the inner annular casing. Cooling the inner annular casing of the high pressure compressor reduces thermal expansion of the casing and decreases the clearance between the inner annular casing of a high pressure compressor in an aircraft engine and high pressure compressor blade tips.

The active clearance control system described herein offers advantages over known methods of controlling clearances in aircraft engines. More specifically, the active clearance control system described herein facilitates using fourth stage compressor bleed air, rather than seventh stage compressor bleed air, as the cooling fluid on the compressor casing. Fourth stage compressor bleed air is typically substantially cooler than seventh stage compressor bleed air. Using fourth stage compressor bleed air as the cooling fluid facilitates a quicker thermal response and faster clearance control. Furthermore, the active clearance control system described herein reduces the weight of the aircraft by reducing the number and/or size of mechanical parts for controlling the clearance between the inner annular casing of a high pressure compressor in an aircraft engine and high pressure compressor blade tips. Additionally, the active clearance control system described herein reduces the weight of the aircraft by improving the performance of the engine.

FIG. 1 is a schematic cross-sectional view of a gas turbine engine 110 in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 and an inner casing 119 encases, in serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. The volume between outer casing 118 and inner casing 119 forms a plurality of cavities 121. A high pressure (HP) shaft or spool 134 drivingly connects HP turbine 128 to HP compressor 124. A low pressure (LP) shaft or spool 136 drivingly connects LP turbine 130 to LP compressor 122. Compressor section 123, combustion section 126, turbine section, and nozzle section 132 together define a core air flowpath 137.

As shown in FIG. 1, fan section 114 includes a fan 138 having a plurality of fan blades 140 coupled to a disk 142 in a spaced apart manner. As depicted, fan blades 140 extend outwardly from disk 142 generally along radial direction R. Fan blades 140 and disk 142, are together rotatable about longitudinal axis 112 by LP shaft 136.

In the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween. A plurality of active clearance control systems 151 are disposed within cavities 121 and circumscribe core turbine engine 116. A fourth stage bleed conduit 153, a seventh stage bleed conduit 155, and a dead cavity bleed conduit 157 are disposed on outer casing 118. A transfer conduit 159 couples fourth stage bleed conduit 153 and dead cavity bleed conduit 157 in flow communication. A valve 161 is disposed within transfer conduit 159 controls flows within fourth stage bleed conduit 153, dead cavity bleed conduit 157, and transfer conduit 159. A controller 163 controls valve 161.

During operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

A first bleed portion of first portion of air 164 as indicated by arrows 165 is bled from HP compressor 124 into cavities 121 and is directed into active clearance control system 151 to cool inner casing 119 or to fourth stage bleed conduit 153. A second bleed portion of first portion of air 164 as indicated by arrows 167 is bled from HP compressor 124 into cavities 121 and to seventh stage bleed conduit 155. Bleed air 165 is directed from fourth stage bleed conduit 153 into transfer conduit 159. Closing valve 161 reduces the flow from fourth stage bleed conduit 153 and directs more bleed air 165 into active clearance control system 151 to cool inner casing 119. After bleed air 165 cools inner casing 119, it is directed into dead cavity bleed conduit 157. Seventh stage bleed conduit 155 and transfer conduit 159 direct bleed air 165 and 167 to other users within the aircraft.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine.

Figure 2:
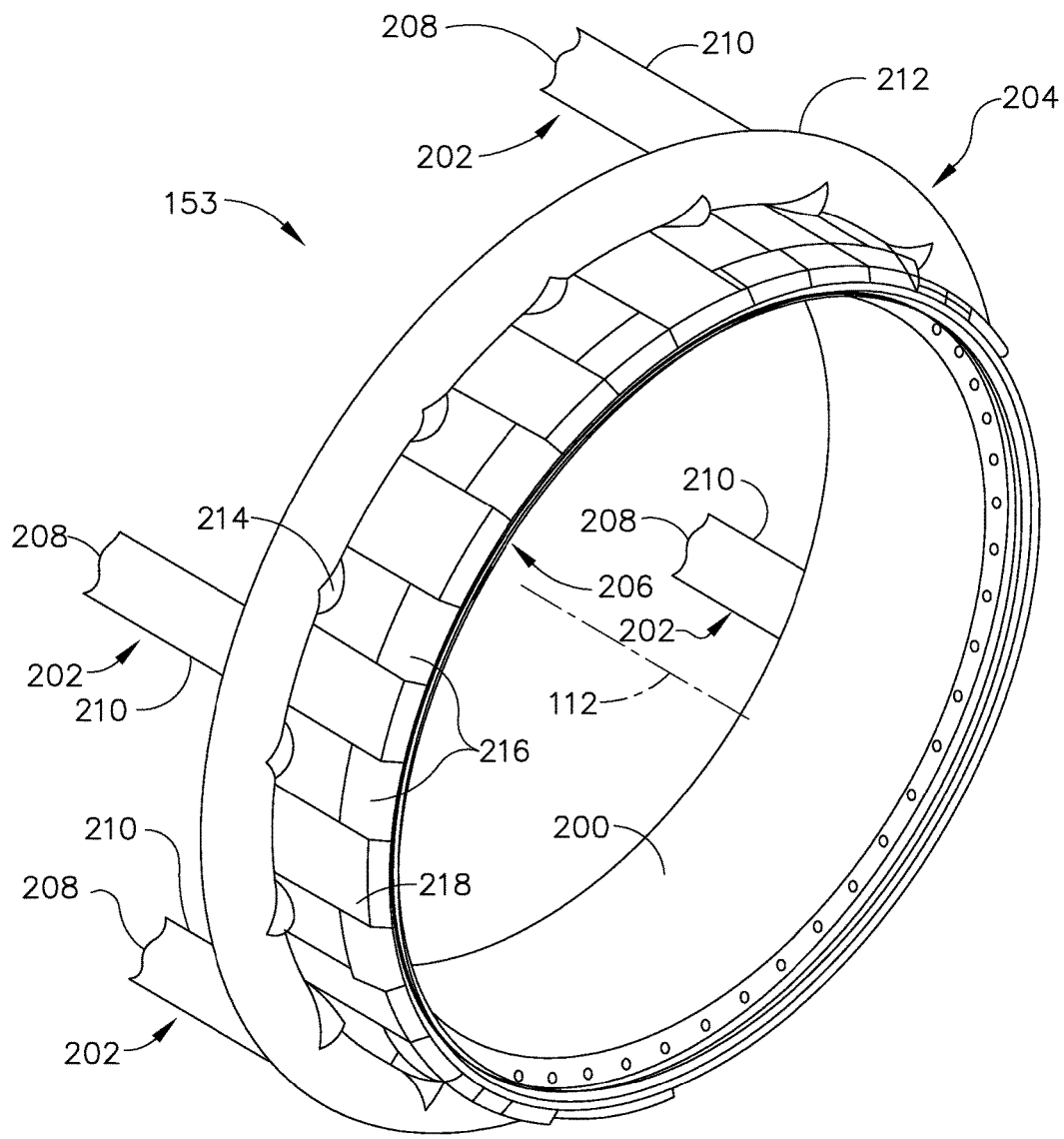
FIG. 2 is a perspective view of the active clearance control system shown in FIG. 1.

FIG. 2 is a perspective view of an inner annular casing 200 and an exemplary active clearance control system 151. Active clearance control system 151 circumscribes inner annular casing 200 which circumscribes HP compressor 124 (shown in FIG. 1). Active clearance control system 151 includes a plurality of air intake systems 202 coupled in flow communication to a manifold system 204 which is coupled in flow communication to an impingement system 206. Each air intake system 202 includes an air supply inlet 208 to an air supply tube 210 located within cavities 121. Multiple air intake systems 202 located circumferentially around manifold system 204 evenly distributes cooling air around manifold system 204. Manifold system 204 includes a distribution manifold 212 and a plurality of supply tubes 214. Distribution manifold 212 is an annular supply tube circumscribing at least a portion of HP compressor 124. Supply tubes 214 are coupled in flow communication with distribution manifold 212 and impingement system 206. Impingement system 206 includes a plurality of plenums 216 circumferentially spaced apart on a radially outer surface 218 of inner annular casing 200. Plenums 216 are in flow communication with radially outer surface 218 of inner annular casing 200.

During operation of turbofan engine 110 (shown in FIG. 1), portion of air 165 is directed or routed into cavities 121 and into air supply inlets 208. Air flows from air supply tube 210 to distribution manifold 212. Distribution manifold 212 distributes air to supply tubes 214 which distribute air to plenums 216. Plenums 216 distribute air to radially outer surface 218 of inner annular casing 200 which cools radially outer surface 218. Cooling radially outer surface 218 reduces thermal expansion of inner annular casing 200.

Figure 3:
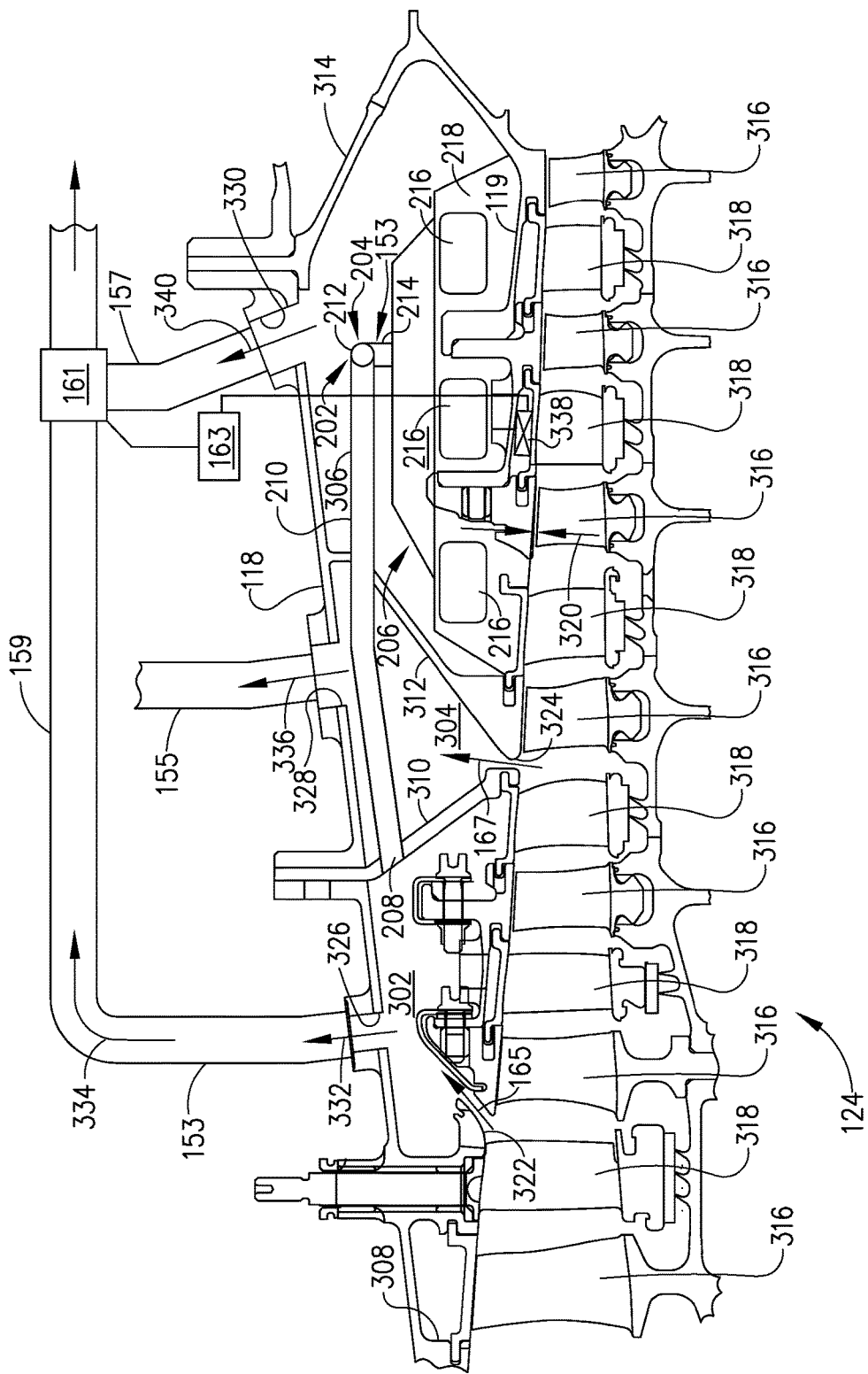
FIG. 3 is a schematic view of the active clearance control system shown in FIGS. 1 and 2 disposed within a cavity isolated from a high pressure compressor bleed air.

FIG. 3 is a schematic view of exemplary active clearance control system 151. Active clearance control system 151 is disposed within forward cavity 302, bleed cavity 304, and aft cavity 306 and circumscribes core turbine engine 116. The volume between outer casing 118, inner casing 119, a forward cavity wall 308, and a forward-bleed cavity wall 310 forms forward cavity 302. The volume between outer casing 118, inner casing 119, forward-bleed cavity wall 310, and a bleed-aft cavity wall 312 forms bleed cavity 304. The volume between outer casing 118, inner casing 119, bleed-aft cavity wall 312, and an aft cavity wall 314 forms aft cavity 306. HP compressor 124 includes HP compressor blades 316 and a plurality of HP compressor vanes 318. Clearance 320 is the distance between HP compressor blades 316 and inner annular casing 119. A fourth stage inner bleed slot 322 couples HP compressor 124 in flow communication with forward cavity 302. A seventh stage inner bleed slot 324 couples HP compressor 124 in flow communication with bleed cavity 304.

Fourth stage bleed conduit 153, seventh stage bleed conduit 155, and dead cavity bleed conduit 157 are disposed on outer casing 118. Transfer conduit 159 couples fourth stage bleed conduit 153 and dead cavity bleed conduit 157 in flow communication. Valve 161 is disposed within transfer conduit 159 controls flows within fourth stage bleed conduit 153, dead cavity bleed conduit 157, and transfer conduit 159. Controller 163 controls valve 161. A fourth stage outer bleed slot 326 couples forward cavity 302 in flow communication with fourth stage bleed conduit 153. A seventh stage outer bleed slot 326 couples bleed cavity 304 in flow communication with seventh stage bleed conduit 155. A dead cavity outer bleed slot 330 couples aft cavity 306 in flow communication with dead cavity bleed conduit 157.

During a first operational embodiment of turbofan engine 110 (shown in FIG. 1), portion of air 165 (shown in FIG. 1) is directed or routed into forward cavity 302 through fourth stage inner bleed slot 322. Portion of air 165 is directed into fourth stage bleed conduit 153 through fourth stage outer bleed slot 326 as indicated by arrow 332. Portion of air 332 is directed into transfer conduit 159 as indicated by arrow 334. Valve 161 is open and allows portion of air 334 to continue to the aircraft for use by the aircraft. Additionally, portion of air 167 (shown in FIG. 1) is directed or routed into bleed cavity 304 through seventh stage bleed slot 324. Portion of air 167 is directed into seventh stage bleed conduit 155 through seventh stage outer bleed slot 326 as indicated by arrow 336 and continues to the aircraft for use by the aircraft.

During a second operational erode of turbofan engine 110 (shown in FIG. 1), portion of air 165 (shown in FIG. 1) is directed or routed into forward cavity 302 through fourth stage inner bleed slot 322. Portion of air 165 is directed into fourth stage bleed conduit 153 through fourth stage outer bleed slot 326 as indicated by arrow 332. Portion of air 332 is directed into transfer conduit 159 as indicated by arrow 334. Valve 161 is at least partially closed and directs portion of air 165 into air supply inlet 208 and air supply tube 210. Air valve 163 is controlled by a controller 163. When turbo fan engine 110 is operating in a build operational mode, valve 163 may be partially open to direct a small portion of portion of air 165 to active clearance control system 151. However, when turbo fan engine 110 is operating in a cruise operational mode, valve 161 may be fully closed to direct a large portion of air 165 to active clearance control system 151. The volume of air directed into active clearance control system 151 may be predetermined for each operational mode. In an alternative embodiment, a proximity sensor 338 measures clearance 320 and transmits clearance 320 to controller 163. Controller 163 modulates the position of valve 161 in response to the measurement of clearance 320.

Air flows from air supply tube 210 flows to distribution manifold 212. Distribution manifold 212 distributes air to supply tubes 214 which distribute air to plenums 216. Plenums distribute air to and cool radially outer surface 218 of inner annular casing 119. Cooling radially outer surface 218 of inner annular casing 119 reduces thermal expansion of inner annular casing 119 and reduces clearance 320. Cooling air is directed into dead cavity bleed conduit 157 as indicated by arrow 340. Valve 161 restricts the flow of cooling air 340 by closing and allowing more air 334 to proceed to other parts of the aircraft.

Fourth stage compressor bleed air 165 is cooler than seventh stage compressor bleed air 167 and cools inner annular casing 119 faster than seventh stage compressor bleed air 167. Bleed-aft cavity wall 312 thermally isolates active clearance control system 151 by preventing seventh stage compressor bleed air 167 from contacting active clearance control system 151. Thermal isolation of active clearance control system 151 prevents heat transfer from seventh stage compressor bleed air 167 to active clearance control system 151 which decreases the temperature of the air in active clearance control system 151. Decreased temperature of portion of air 165 in active clearance control system 151 increases cooling of radially outer surface 218 of inner annular casing 119 which decreases thermal expansion of inner annular casing 119 and decreases clearance 320.

The above-described active clearance control system provides an efficient method for controlling the blade clearance in a turbomachine. Specifically, delivering forth stage compressor bleed air directly to the surface of the HP compressor reduces thermal expansion of the HP compressor casing. Additionally, delivering fourth stage compressor bleed air directly to the surface of the HP compressor rather than using actuators and linkages reduces the weight of the turbomachine. Finally, preventing compressor bleed air from contacting the active clearance control system decreases the temperature of the fourth stage compressor bleed air contacting the surface of the HP compressor and increases the response rate of the active clearance control system.

An exemplary technical effect of the methods, systems, and apparatus described herein includes at least one of: (a) decreasing the temperature on the inner annular casing of a turbomachine; (b) decreasing the clearance between the HP compressor blade tips and the inner annular casing of a turbomachine; and (c) decreasing the heat transfer from compressor bleed air to the active clearance control system in the bleed cavities.

Exemplary embodiments of the active clearance control system are described above in detail. The active clearance control system, and methods of operating such units and devices are not limited to the specific embodiments described herein, but rather, components of systems and/or steps of the methods may be utilized independently and separately from other components and/or steps described herein. For example, the methods may also be used in combination with other systems for controlling clearances, and are not limited to practice with only the systems and methods as described herein. Rather, the exemplary embodiment may be implemented and utilized in connection with many other machinery applications that require clearance control.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A clearance control system for a turbomachine, the turbomachine including a compressor defining an axis of rotation, an inner annular casing extending circumferentially over at least a portion of the compressor, the inner annular casing including a radially outer surface, the turbomachine further including an outer annular casing extending over at least a portion of the inner annular casing, the inner annular casing and the outer annular casing defining at least one cavity therebetween, said clearance control system comprising:
a manifold system comprising at least one conduit disposed within said at least one cavity, said at least one conduit extending axially along the inner annular casing, said at least one conduit configured to channel a flow of cooling fluid between said at least one cavity;
an impingement system comprising a header and at least one plenum configured to channel said flow of cooling fluid to the radially outer surface of the inner annular casing and disposed within said at least one cavity, said impingement system extending circumferentially about the inner annular casing, said at least one conduit configured to channel said flow of cooling fluid to said impingement system; and
a channel system comprising at least one channel disposed on the radially outer surface of the inner annular casing and configured to channel said flow of cooling fluid to the turbomachine, wherein said at least one channel is configured to control said flow of cooling fluid to said manifold system.

2. The clearance control system of claim 1, wherein said at least one cavity comprises a first cavity, a second cavity, and a third cavity, said manifold system configured to channel said flow of cooling fluid from said first cavity through said second cavity to said third cavity.

3. The clearance control system of claim 2, wherein a bleed slot channels said flow of cooling fluid to said first cavity and a bleed slot channels said flow of cooling fluid to said second cavity.

4. The clearance control system of claim 3 further comprising a wall disposed between said second and third cavity, said wall configured to isolate said second cavity from said third cavity.

5. The clearance control system of claim 4, wherein said wall comprises a thermal insulating material.

6. The clearance control system of claim 1, wherein said channel system comprises an air valve.

7. The clearance control system of claim 6 further comprising a controller configured to control the position of said air valve.

8. The clearance control system of claim 1, wherein said cooling fluid comprises air.

9. A method of controlling a clearance between a tip of at least one compressor blade and an inner annular casing, said method comprising:
defining a first cavity, a second cavity, and a third cavity between the inner annular casing and an outer annular casing;
channeling at least one flow of cooling fluid from the first cavity to a manifold system including at least one conduit disposed within the second and third cavities; and
channeling the at least one flow of cooling fluid from the manifold system to an impingement system disposed within the third cavity and positioned on a radially outer surface of the inner annular casing.

10. The method of claim 9, wherein channeling at least one flow of cooling fluid from the first cavity to a manifold system comprises channeling air from the first cavity to a manifold system.

11. The method of claim 9, wherein defining a first cavity, a second cavity, and a third cavity between the inner annular casing and an annular outer casing comprises defining a first cavity, a second cavity, and a third cavity between the inner annular casing and an annular outer casing, the first and second cavity in flow communication with a high pressure compressor.

12. The method of claim 9, wherein defining a first cavity, a second cavity, and a third cavity between the inner annular casing and an annular outer casing comprises defining a first cavity, a second cavity, and a third cavity between the inner annular casing and an annular outer casing, the third cavity thermally isolated from a high pressure compressor.

13. The method of claim 9, wherein channeling at least one flow of cooling fluid from the first cavity to a manifold system including at least one conduit disposed within the second and third cavities comprises channeling at least one flow of cooling fluid from the first cavity to an air valve disposed within the manifold system.

14. A turbomachine comprising:
a compressor defining an axis of rotation, said compressor comprising:
an inner annular casing comprising a radially outer surface; and
an outer annular casing extending over at least a portion of the inner annular casing, said inner annular casing and said outer annular casing defining a plurality of cavities therebetween; and
a clearance control system comprising:
a manifold system comprising a plurality of conduits disposed within said plurality of cavities, said plurality of conduits extending axially along the inner annular casing, said plurality of conduits configured to channel a flow of cooling fluid between said plurality of cavities;

an impingement system comprising a header and a plurality of plenums configured to channel said flow of cooling fluid to the radially outer surface of the inner annular casing and disposed within said plurality of cavities, said impingement system extending circumferentially about the inner annular casing, said plurality of conduits configured to channel said flow of cooling fluid to said impingement system; and a channel system comprising a plurality of channels disposed on the radially outer surface of the inner annular casing and configured to channel said flow of cooling fluid to the turbomachine, wherein said plurality of channels is configured to control said flow of cooling fluid to said manifold system.

15. The turbomachine of claim 14, wherein said cooling fluid comprises air.

16. The turbomachine of claim 14, wherein said plurality of cavities comprises a first cavity, a second cavity, and a third cavity, said manifold system configured to channel said flow of cooling fluid from said first cavity through said second cavity to said third cavity.

17. The turbomachine of claim 16 further comprising a wall disposed between said second and third cavity, said wall configured to isolate said second cavity from said third cavity.

18. The turbomachine of claim 17, wherein said wall comprises a thermal insulating material.

19. The turbomachine of claim 14, wherein said channel system comprises an air valve.

20. The turbomachine of claim 19 further comprising a controller configured to control the position of said air valve.

* * * * *